Figure 1:
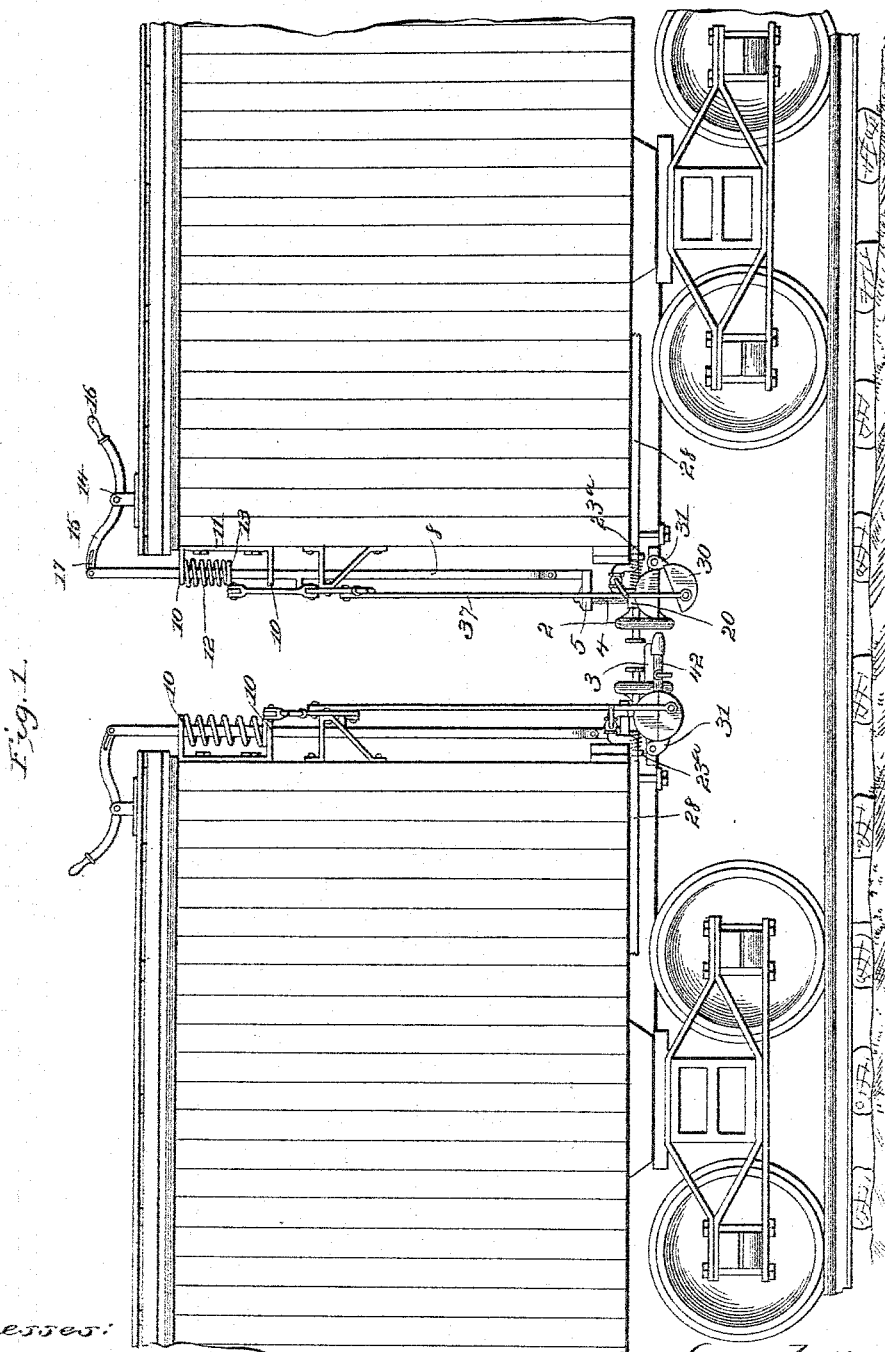

(No Model.) 3 Sheets—Sheet 1.

J. C. SMITH.
COMBINED CAR AND AIR BRAKE COUPLING.

No. 491,227. Patented Feb. 7, 1893.

Witnesses:
Harry D. Rhew.
Wm. E. Knight.

Inventor:
Jacob C. Smith.
By Knight Bros.
Attorneys.

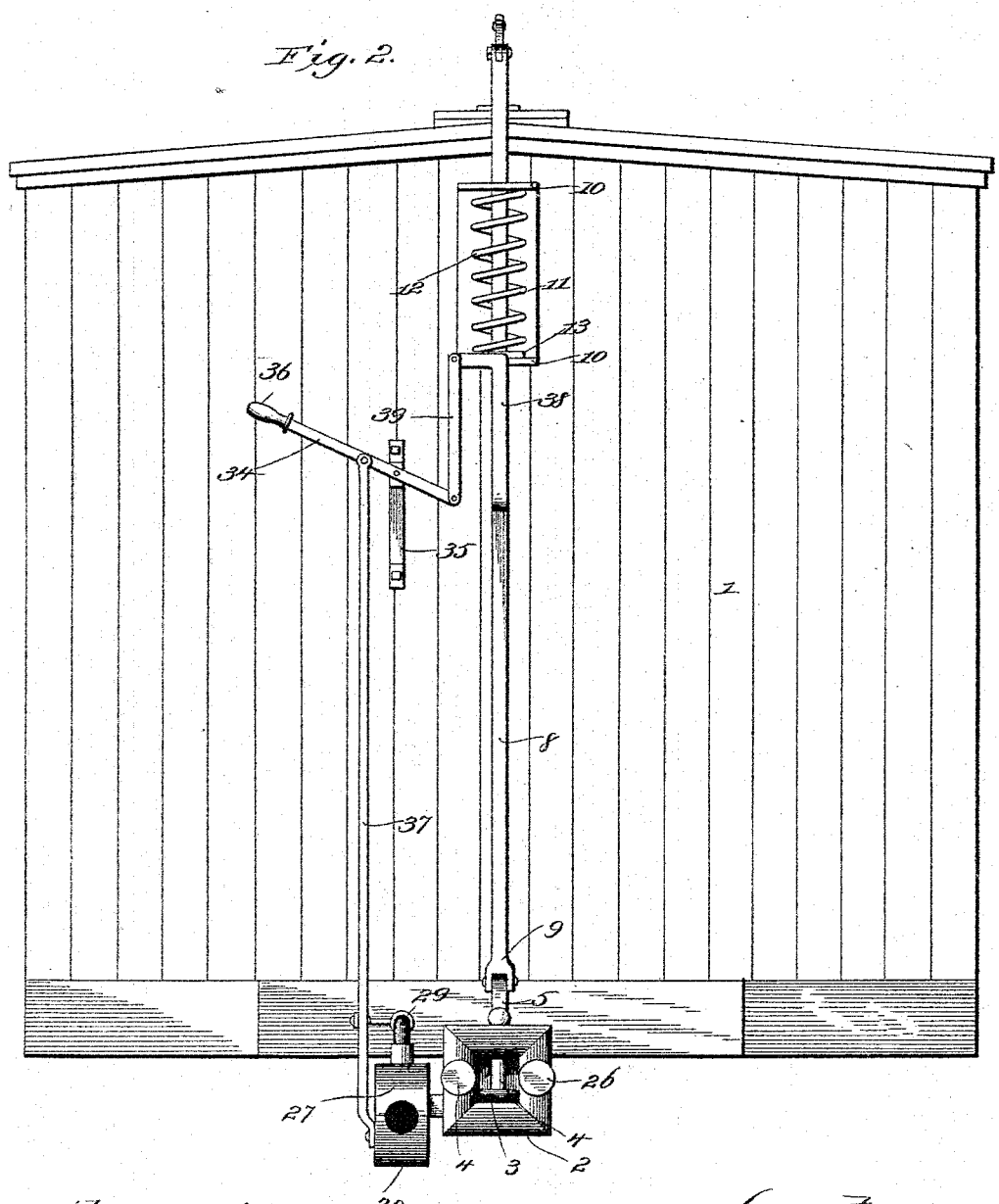

(No Model.) 3 Sheets—Sheet 3.
J. C. SMITH.
COMBINED CAR AND AIR BRAKE COUPLING.
No. 491,227. Patented Feb. 7, 1893.
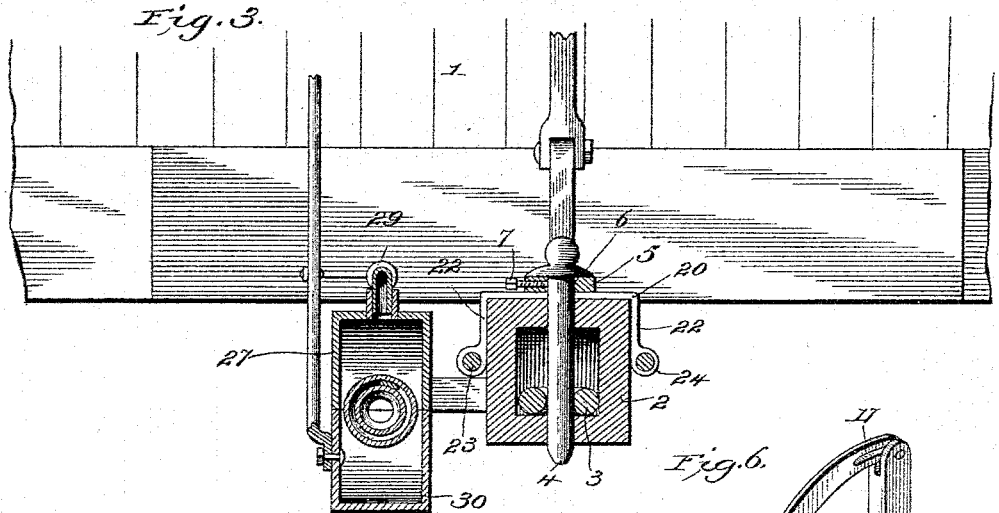
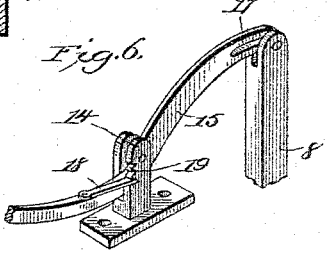
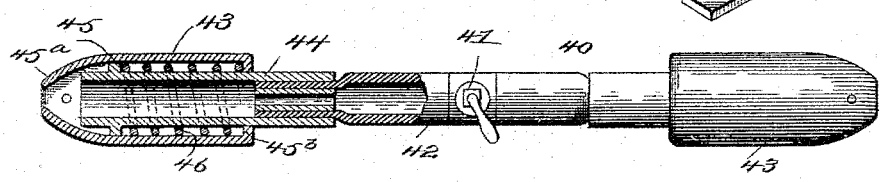
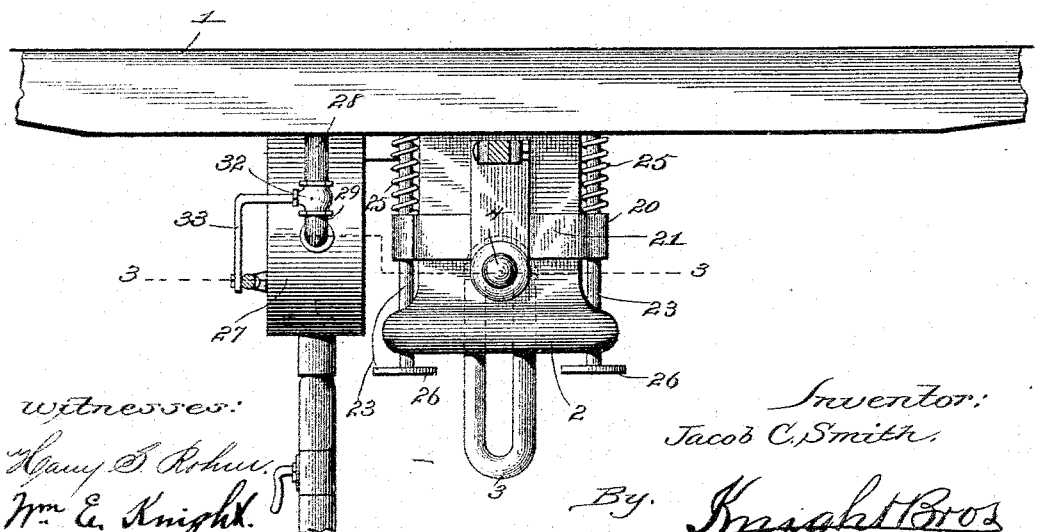
Witnesses:
Harry S. Rohrer
Wm. E. Knight
Inventor:
Jacob C. Smith
By Knight Bros
Attorneys.

UNITED STATES PATENT OFFICE.

JACOB CALVIN SMITH, OF LULING, TEXAS, ASSIGNOR OF ONE-HALF TO JOHN HOOD GOLFIN AND EMMANUEL J. HARDEMAN, OF SAME PLACE.

COMBINED CAR AND AIR-BRAKE COUPLING.

SPECIFICATION forming part of Letters Patent No. 491,227, dated February 7, 1893.

Application filed October 26, 1889. Serial No. 328,347. (No model.)

*To all whom it may concern:*

Be it known that I, JACOB CALVIN SMITH, a citizen of the United States, and a resident of Luling, in the county of Caldwell and State of Texas, have invented certain new and useful Improvements in Automatic Car and Air-Brake Couplings, of which the following specification, taken in connection with the accompanying drawings, is a full, clear, and exact description, such as will enable those skilled in the art to make and use the same.

The object of my improvements is to provide a simple and effective combination coupler for the cars and the air-brake pipes, which coupler will be automatically operated by the bumping together of the cars and will obviate the necessity of an attendant.

To this end my invention consists essentially of automatic coupling devices for the cars and air-brake pipes, which devices are connected together by a suitable system of levers so as to be automatically operated by the bumping together of the cars. The car-coupling device comprises the ordinary draw-head provided with a sliding yoke adapted to cover the pin hole and support the pin in elevated position, longitudinally movable bumper rods secured to the sliding yoke and adapted to move it from under the pin so as to allow the same to drop into locked position, suitable operating levers for raising the pin and uncoupling the car, and springs for returning the pin-supporting yoke under the end of the pin for supporting it in raised position. The coupling device for the air-brake pipes comprises a sectional coupling box having air-tight connections with the train pipe of the air-brakes, a pipe section adapted to be automatically engaged by the coupling box, and suitable levers connecting the movable jaw or section of the coupling box to the pin-operating levers. And my invention consists of other features of novelty, all of which will first be described with reference to the accompanying drawings and the novelty particularly pointed out in the claims.

In said drawings:—Figure 1 is a side elevation of portions of two railway cars embodying my improvements, the device being in coupled position on one of the cars and in uncoupled position on the other car, and the cars being represented in the act of coupling. Fig. 2 is an end view of one of the cars showing the devices in coupled position. Fig. 3 is an end sectional view taken on the line 3—3, of Fig. 5. Fig. 4 is an enlarged detail elevation of the section of coupling pipe, one end of the same being broken away to show the internal structure. Fig. 5 is an enlarged detail plan elevation of the coupling device, the operating rods being shown in section. Fig. 6 is a detail perspective view representing the means for holding the operating levers in raised position.

1, 1, is any ordinary construction of cars provided at their ends with the customary draw-heads 2, 2.

3 is the ordinary coupling link, and 4 is the common construction of coupling pin which is adapted to slide vertically and rest in the pin opening which extends through the draw-head.

5 is a right-angled pin lifting arm having an opening 6 through its forward enlarged end in which the pin 4 is seated.

7 is a set screw passing through a suitable screw-threaded perforation in the pin lifter 5 and engaging the pin 4 so as to hold it securely therein.

8 is a vertically moving rod formed with a bifurcated lower end 9 which is pivotally attached to the vertical extension of the pin-lifter 5, in order to allow for the longitudinal movement of the draw-head when the pin is in coupled position. The rod 8 passes through suitable openings in brackets 10 which are formed integral to the base plate 11 which is secured to the front end of the car 1 as clearly shown in the drawings.

12 is a strong spiral spring surrounding the rod 8 and engaging at its upper end the upper bracket 10 and at its lower end the collar 13 secured to the rod 8. The tendency of the spring 12 is to force the rod 8 (carrying the pin-lifter and pin), downwardly. Projecting from the car 1, is an upright support 14 to which is pivoted the operating lever 15 formed at one end with the handle 16 and at the other end with the slot 17. The slotted end of the lever 15 is pivoted to the upper end of the rod 8 as shown in the drawings, so that the said rod can be raised vertically by said lever against the action of the spring 12.

18 is a tongue pivoted to the upper edge of the operating lever 15 and adapted to be moved to one side so as to engage the serrations 19 formed on the inner edge of the support 14, and hold the lever 15 and rod 8 in raised position so that the pin will not drop into coupled position.

In order to support the coupling pin in raised position, and automatically drop it into engagement with the link at the proper time, I provide the following mechanism:—20 is a horizontally sliding yoke formed with the horizontal plate 21 adapted to rest on top of the draw-head, and vertical plates or arms 22 embracing the sides of the draw-head, and forming guides for the yoke in its horizontal reciprocation on the draw-head. 23 are sliding rods supported in the perforated ears 23$^a$, and the perforated flange of the draw-head, and passing through and secured in eyes 24 formed on the lower ends of the plates 22 of the yoke. 25 are spiral springs surrounding the rods 23 and engaging at their inner ends the ears 23$^a$ of the draw-head and at their outer ends the eyes 24 of the yoke, so as to hold the rods 23 and the yoke 20 normally in their outer positions. On the outer ends of the rods 23 I form the customary bumper plates 26, the rods 23 serving the double purpose of bumpers and means for actuating the yoke. When the yoke is in its normal outer position, as shown on the right hand car of Fig. 1, the plate 21 thereof is directly over the pin-hole of the draw-head, so that the end of the pin 4 cannot enter the pin-hole, but will rest on top of the yoke and be supported thereby. It will also be observed that when the rods 23 are forced rearwardly against the action of the springs 25, the yoke 20 will also be carried to the rear and the plate 21 will be removed from under the end of the coupling pin and allow the same to drop or be forced into position by the spring 12.

In combination with the above-described automatic car-coupler, I employ an automatic coupling device for coupling the train pipes of the customary air-brake systems. This air-brake coupling device consists of the following mechanism:—Secured to one side of the draw-head is the upper half or section 27 of the air-tight coupling box, which has an air-tight connection, through which the coupling section 29, with the train pipe 28, which extends along under the car in the customary manner. 30 is the lower movable section of the coupling box formed with the rearwardly extending ear 31, which is pivotally connected to the extension of the upper section, both sections, when closed, forming a substantially cylindrical air-tight coupling box. In the forward contiguous edges of the sections 27 and 30, are formed semi-circular openings, between which the end of the coupling pipe is adapted to engage. 32 is a cock in the pipe coupling 29 formed with an extending operating arm 33. 34 is a lever pivoted to a bracket 35 secured to the end of the car and formed with a handle 36 at its outer end by which it can be operated. 37 is a rod pivotally connected at its outer ends to the lever 34 and the lower pivoted section 30 of the coupling box, whereby the said section of the coupling box can be raised into closed position. 38 is an arm formed integral with and extending from the rod 8, and 39 is a link connecting the arm 38 with the end of the lever 34, whereby the coupling box will be opened and the train pipe coupling uncoupled, when the rod 8 is raised for uncoupling the cars. The rod 37 is also pivotally attached to the outer end of the operating arm 33 of the cock 32, so that when the coupling box is opened the air in the train pipe will be shut off by the turning of the cock, and when the box is closed, the air will be turned on by the turning of the cock. The engaging edges of the sections 27 and 30 of the coupling box are of course provided with suitable rubber gaskets to insure air-tight connections between them. The strength of the spring 12 and the arrangement of the lever 34 is of course such that the pressure in the train pipe and coupling box, (which is usually forty pounds to the square inch,) will be properly sustained and the box held in closed position. 40 is a coupling section of pipe which forms the connection between the cars for the passage of the air in the train pipe. It is preferably provided with a cock 41 at its center which may be turned off when the car is disconnected from another car and forms the end of a train. The preferred form of coupling section is shown in Fig. 4 of the drawings, and consists essentially of the center rubber portion 42 provided with the cock 41, and the metal heads 43 at each end. The heads consist of an inner tube 44 securely attached to the end of the rubber tubing in any suitable manner, and formed with an annular flange 44$^a$ near its outer end; and the bullet-shaped cap 45 formed with the perforated tapered forward end 45$^a$ and the internal flange 45$^b$ at its rear end which fits over the tube 44 and is adapted to slide thereon. A spiral spring 46 surrounds a tube 44 and is confined between the flanges 44$^a$ and 45 on the tube 44 and cap 45 respectively. The head 43 of the coupling section is adapted to enter the coupling box, (the tapered end serving to guide it therein) and be retained therein by the jaws of the box engaging behind the head. The spiral spring 46 serves to allow for any movement between the cars.

The operation of my device is as follows:— The cars being in the position shown in Fig. 1, with the air pipe coupling section secured in the coupling box on one of the cars and the coupling pin secured in the draw-head of the same car, the cars are bumped together so that the yoke 20 will be forced rearwardly against the action of the springs 25 which will allow the pin 4 to drop into engagement with the coupling link and couple the cars. The rod 8 also drops with the pin 4, or is forced downwardly therewith by the spring 12, and as the rod 8 moves downward the lever 34 is actuated so as to raise the link 37 which closes the lower section 30 of the coupling box against the upper section 27 so as to engage the end of the coupling pipe, and at the same time move the cock 32 so as to turn on the air in the train pipe.

When it is desired to uncouple the cars and air-brake pipes, the rod 8 is raised vertically against the action of the spring 12 by means of one of the levers 15 or 34, which raises the coupling pin out of engagement with the coupling link and allows the yoke 20 to slide under it and hold it in raised position, and lowers the movable section of the air-brake coupling to uncouple the same. If it is desired to retain the mechanism in uncoupled position so they will not couple by the bumping together of the cars, the tongue 18 on the lever 15 is turned into engagement with the serrations 19 on support 14, as already explained.

From the above it will be seen that my device is automatic in every respect and needs no attention except to turn the top 41 in the middle of the coupling pipe after the cars are coupled in position.

Having thus described my invention, the following is what I claim as new and desire to secure by Letters Patent.

1. An automatic air-brake coupling comprising a sectional coupling box having airtight communication with the train-pipe and adapted to receive and couple the end of the coupling pipe section, means for holding the coupling box in open position, and means controlled and actuated by the bumping together of the cars for closing the coupling box and coupling the air brake pipes, substantially as set forth.

2. An automatic air brake coupling comprising a sectional coupling box having air tight communication with the train-pipe and adapted to receive and couple the end of the coupling pipe section, one of the sections of the coupling box being pivotally supported, a system of levers connected to said pivoted section and adapted to open and close the same, a sliding yoke for supporting the levers and holding the section of the coupling box in open position, a spring for forcing the section of the coupling box into closed position, and sliding bumper rods adapted to move the sliding yoke and allow the coupling box to be closed when the cars bump together, substantially as set forth.

3. An automatic air-brake coupling comprising a sectional coupling box having air tight communication with the train-pipe and adapted to receive and couple the end of the coupling pipe section, one of the sections being pivotally supported, a vertically movable rod connected to said pivoted section, means for holding said rod in lowered position for keeping the coupling box open, means for raising said rod for closing the coupling box, a cock in the train-pipe and a suitable connection between the cock and said vertically movable rod, whereby the air in the train-pipe will be cut off when the coupling box is open and vice versa, substantially as set forth.

4. An automatic coupling mechanism for railway cars and their air-brake pipes, comprising a suitable car coupling, an air brake coupling having air-tight communication with the train pipe, suitable means connecting the car and air-brake couplings for holding them in uncoupled position, and means actuated by the bumping together of the cars for simultaneously tripping said car and air-brake couplings, substantially as set forth.

5. An automatic coupling mechanism for railway cars and their air-brake pipes, comprising a coupling pin and link, an air-brake coupler composed of a stationary section having an air-tight communication with the train-pipe and a movable section adapted to be moved to and from the stationary section, and suitable devices connecting the movable section of the air-brake coupling with the coupling pin, whereby both coupling devices can be operated simultaneously, substantially as set forth.

6. An automatic coupling mechanism for railway cars and air-brakes, comprising a coupling pin and link, a vertically movable rod connected to the pin, a spring for forcing said rod and pin normally downward, a lever for raising said rod and pin against the action of the spring, a sliding yoke adapted to engage the end of the pin and hold it in raised position, bumper rods connected to said yoke, an air-brake coupler composed of a stationary section having air-tight communication with the train-pipe and a movable section adapted to be moved to and from the stationary section, and suitable levers connecting the movable section with the vertically movable rod, substantially as and for the purpose set forth.

7. An automatic coupling mechanism for railway cars and air-brakes, comprising a coupling pin and link, a pin lifting arm engaging the pin, a vertically movable rod pivoted to the pin-lifting arm, a spiral spring surrounding the vertically movable rod and engaging at one end a collar on said rod and at the other end a lug on the car body, an operating lever attached to said rod, a sliding yoke supported on the draw-head and adapted to support the pin, sliding spring pressed bumper rods mounted on the draw-head and connected to and adapted to actuate the sliding yoke, an air-brake coupling composed of a stationary member having air-tight communication with the train-pipe, and a movable section supported in proper relation thereto, and a suitable system of levers connecting the movable section of the air-brake coupling with the vertically movable rod, substantially as and for the purpose set forth.

8. The combination with a railway car, a coupling pin and link, a vertically sliding rod attached to the pin and adapted to move the same vertically, a spring for forcing the rod normally downward, a sliding yoke mounted upon the draw-head and adapted to support the pin in uncoupled position, sliding bumper rods connected with the yoke and adapted to move it from under the pin when the cars bump together, an automatic sectional coupling box having air tight connection with the train-pipe, and means for connecting the coupling box with the pin-controlling rod, whereby the cars and air-brake pipes are coupled simultaneously.

JACOB CALVIN SMITH.

Witnesses:
 THOS. MCNEAL,
 W. G. LOVE.